(12) United States Patent
Togashi

(10) Patent No.: US 7,974,070 B2
(45) Date of Patent: Jul. 5, 2011

(54) MULTILAYER CERAMIC DEVICE AND MOUNTING STRUCTURE THEREFOR

(75) Inventor: Masaaki Togashi, Tokyo (JP)

(73) Assignee: TDK Corporation, Toyko (JP)

( * ) Notice: Subject to any disclaimer, the term of this patent is extended or adjusted under 35 U.S.C. 154(b) by 236 days.

(21) Appl. No.: 12/206,353

(22) Filed: Sep. 8, 2008

(65) Prior Publication Data

US 2009/0080137 A1    Mar. 26, 2009

(30) Foreign Application Priority Data

Sep. 21, 2007   (JP) ................. P2007-246198

(51) Int. Cl.
*H01G 7/00*  (2006.01)
*H01G 4/06*  (2006.01)
*H01G 4/228* (2006.01)

(52) U.S. Cl. ................. 361/282; 361/311; 361/309

(58) Field of Classification Search .......... 361/311, 361/282, 306.1, 306.3, 309

See application file for complete search history.

(56) References Cited

U.S. PATENT DOCUMENTS 6,819,091 B2 * 11/2004 Ishihara et al. ............... 323/285

FOREIGN PATENT DOCUMENTS

| JP | A-62-137804 |   | 6/1987 |
|----|-------------|---|--------|
| JP | A-5-101964  |   | 4/1993 |
| JP | A-6-251993  |   | 9/1994 |
| JP | 09266104 A  | * | 10/1997 |
| JP | 10270207 A  | * | 10/1998 |
| JP | A-2001-23864 |  | 1/2001 |
| JP | 2001143904 A | * | 5/2001 |

* cited by examiner

*Primary Examiner* — Eric Thomas
(74) *Attorney, Agent, or Firm* — Oliff & Berridge, PLC

(57) ABSTRACT

An NTC capacitor comprises a capacitor body having a plurality of insulator layers laminated therein, first to third inner electrodes arranged within the capacitor body, and first to third terminal electrodes arranged on outer surfaces of the capacitor body. The first inner electrode is connected to only the first terminal electrode. The second inner electrode is connected to only the second terminal electrode. The third inner electrode is connected to only the third terminal electrode. The third inner electrode opposes none of the first and second inner electrodes in the laminating direction of the insulator layers.

18 Claims, 12 Drawing Sheets

MULTILAYER CERAMIC DEVICE AND MOUNTING STRUCTURE THEREFOR

BACKGROUND OF THE INVENTION

1. Field of the Invention

The present invention relates to a multilayer ceramic device and a mounting structure therefor.

2. Related Background Art

As a device which varies an electric characteristic in response to changes in temperature, a multilayer ceramic device described in Japanese Patent Application Laid-Open No. 62-137804 has conventionally been known, for example.

SUMMARY OF THE INVENTION

However, it has been difficult for the multilayer ceramic device described in Japanese Patent Application Laid-Open No. 62-137804 to raise the accuracy in temperature detection, since it detects changes in temperature according to changes in temperature of air thereabout.

It is therefore an object of the present invention to provide a multilayer ceramic device which can accurately detect temperature, and a mounting structure therefor.

The multilayer ceramic device in accordance with the present invention comprises a body, adapted to change an electric characteristic according to temperature, having a plurality of insulator layers laminated therein; first, second, and third inner electrodes arranged within the body; and first, second, and third terminal electrodes arranged on an outer surface of the body; wherein the first to third terminal electrodes are electrically insulated from each other on the outer surface of the body; wherein the first inner electrode is connected to only the first terminal electrode; wherein the second inner electrode is connected to only the second terminal electrode; wherein the third inner electrode is connected to only the third terminal electrode; and wherein the third inner electrode opposes none of the first and second inner electrodes in the laminating direction of the insulator layers.

The mounting structure for a multilayer ceramic device in accordance with the present invention is a mounting structure for mounting a multilayer ceramic device to a substrate mounted with an electronic device adapted to generate heat; the multilayer ceramic device comprising a body, adapted to change an electric characteristic according to temperature, having a plurality of insulator layers laminated therein; first, second, and third inner electrodes arranged within the body; and first, second, and third terminal electrodes arranged on an outer surface of the body; wherein the first to third terminal electrodes are electrically insulated from each other on the outer surface of the body; wherein the first inner electrode is connected to only the first terminal electrode; wherein the second inner electrode is connected to only the second terminal electrode; wherein the third inner electrode is connected to only the third terminal electrode; wherein the third inner electrode opposes none of the first and second inner electrodes in the laminating direction of the insulator layers; and wherein the third terminal electrode and a terminal electrode of the electronic device are electrically connected to each other on the substrate.

In the above-mentioned multilayer ceramic device, the first to third inner electrodes are connected to only their corresponding terminal electrodes in the first to third terminal electrodes. Namely, the first to third inner electrodes are not short-circuited within the multilayer ceramic device. Therefore, for example, the third terminal electrode and a terminal electrode of a heating device can be connected to each other, whereby temperature changes in the heating device can be detected rapidly and accurately. The third inner electrode opposes none of the first and second inner electrodes in the laminating direction of the insulator layers. This restrains the third inner electrode from affecting the first and second inner electrodes even when the third terminal electrode is connected to the terminal electrode of the heating device, for example.

Preferably, the body is formed like a rectangular parallelepiped having first and second rectangular main faces opposing each other, first and second side faces extending in longer sides of the first and second main faces so as to connect the first and second main faces to each other and opposing each other, and first and second end faces extending along shorter sides of the first and second main faces so as to connect the first and second main faces to each other and opposing each other; the third terminal electrode is arranged on the first or second side face; and the third inner electrode extends so as to reach the first or second side face arranged with the third terminal electrode and is connected to the third terminal electrode. This can increase the width of the third terminal electrode and the width of the portion of the third inner electrode connected to the terminal electrode, whereby temperature changes can be detected rapidly and accurately.

The present invention can provide a multilayer ceramic device which can accurately detect temperature, and a mounting structure therefor.

The present invention will become more fully understood from the detailed description given hereinbelow and the accompanying drawings which are given by way of illustration only, and thus are not to be considered as limiting the present invention.

The present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

In the following, preferred embodiments will be explained in detail with reference to the accompanying drawings. In the explanations, the same constituents or those having the same functions will be referred to with the same numerals or letters, while omitting their overlapping descriptions.

First Embodiment

Figure 1:
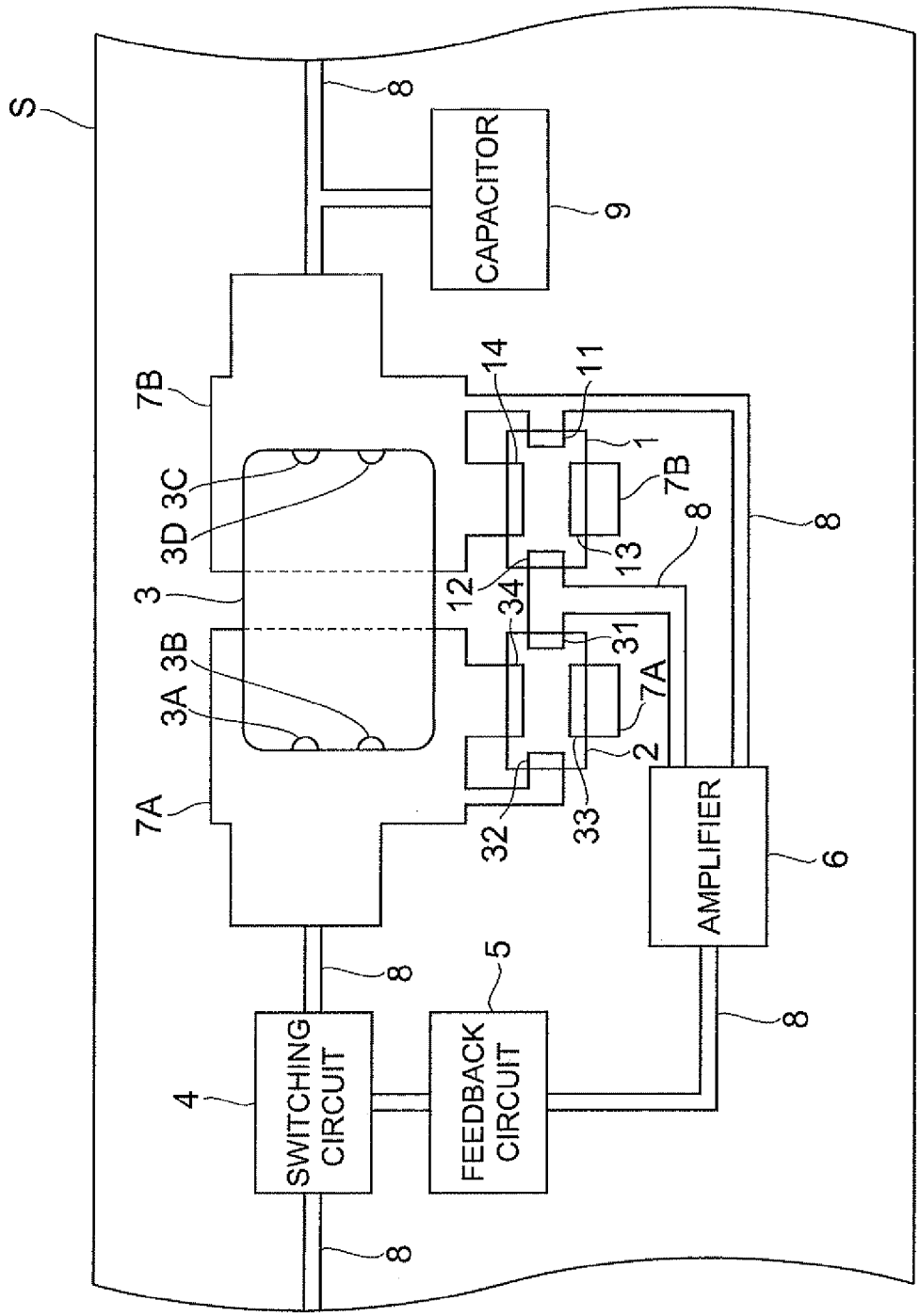
FIG. 1 is a diagram of the mounting structure for a multilayer ceramic device in accordance with a first embodiment.
Figure 2:
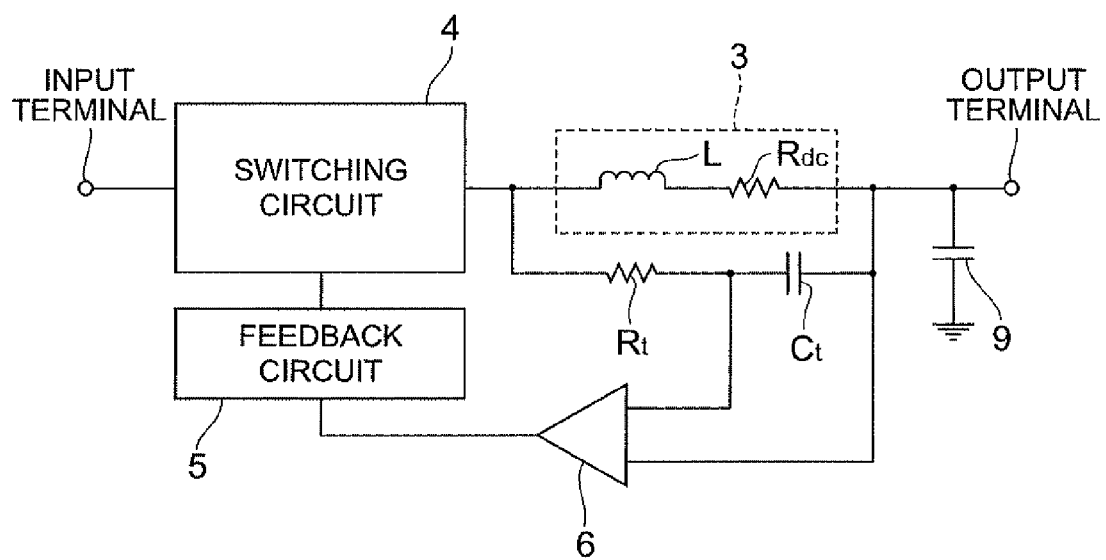
FIG. 2 is an equivalent circuit diagram of the mounting structure for a multilayer ceramic device in accordance with the first embodiment.

With reference to FIGS. 1 and 2, the mounting structure for a multilayer ceramic device in accordance with the first embodiment will be explained. FIG. 1 is a diagram of the mounting structure for a multilayer ceramic device in accordance with the first embodiment. FIG. 2 is an equivalent circuit diagram of the mounting structure for a multilayer ceramic device in accordance with the first embodiment.

As shown in FIG. 1, an NTC (negative temperature coefficient) capacitor 1, an NTC thermistor 2, a choke coil 3, a switching circuit 4, a feedback circuit 5, an amplifier 6, and a capacitor 9 are arranged on a substrate S in the mounting structure in accordance with the first embodiment. Here, the NTC capacitor 1 refers to a multilayer ceramic device having a negative temperature characteristic, i.e., a characteristic in which capacitance decreases as temperature rises. The NTC thermistor 2 refers to a multilayer ceramic device having a negative temperature characteristic, i.e., a characteristic in which resistance decreases as temperature rises.

As shown in FIG. 1, terminal electrodes 3A, 3B of the choke coil 3 are connected to a land pattern 7A formed on the substrate S, while terminal electrodes 3C, 3D of the choke coil 3 are connected to a land pattern 7B formed on the substrate S.

First and second terminal electrodes 31, 32 of the NTC thermistor 2 which will be explained later are connected to leads 8. Third and fourth terminal electrodes 33, 34 of the NTC thermistor 2 which will be explained later are connected to the land pattern 7A connected to the terminal electrodes 3A, 3B of the choke coil 3.

First and second terminal electrodes 11, 12 of the NTC capacitor 1 which will be explained later are connected to leads 8. Third and fourth terminal electrodes 13, 14 of the NTC capacitor 1 which will be explained later are connected to the land pattern 7B connected to the terminal electrodes 3C, 3D of the choke coil 3.

As shown in FIGS. 1 and 2, the leads 8 connected to the first and second terminal electrodes 11, 12 of the NTC capacitor 1 are connected to the amplifier 6. The amplifier 6, feedback circuit 5, and switching circuit 4 are connected together by one lead 8.

In the mounting structure in accordance with the first embodiment as can be understood from FIG. 2, by way of the switching circuit 4, a current fed from an input terminal flows through a set of an inductor L and a resistance Rdc in the choke coil 3 and a set of a resistance Rt of the NTC thermistor 2 and a capacitor Ct of the NTC capacitor 1 which are connected in parallel with the former set. After passing this parallel circuit, the current is outputted from the output terminal.

Weak current levels before and after passing the capacitor Ct of the NTC capacitor 1 are fed into the amplifier 6, so as to be amplified. The feedback circuit 5 determines a voltage between both ends of the capacitor Ct of the NTC capacitor 1, and a current value is calculated from thus measured voltage value.

According to thus calculated current value, the feedback circuit 5 transmits an on/off signal to the switching circuit 4. According to this signal, the switching circuit 4 switches on or off.

When the current flows through the choke coil 3, the DC resistance Rdc of the choke coil 3 heats itself. This heating changes characteristics of the choke coil 3, i.e., the inductance value of the inductor L and the resistance value of the DC current Rdc. In the circuit of FIG. 2, in response to the change in characteristics of the choke coil 3 caused by the heating, the capacitance C of the NTC capacitor 1 and the resistance Rt of the NTC thermistor 2 vary so as to cancel the change in characteristics of the choke coil 3 caused by the heating.

The current value calculated according to the voltage between both ends of the capacitor Ct of the NTC capacitor 1 equals the current flowing through the choke coil 3. Therefore, in the circuit of FIG. 2, the current flowing through the choke coil 3 can be detected in the feedback circuit 5. According to the detected current value, the feedback circuit 5 and switching circuit 4 monitor the current outputted from the output terminal.

Figure 3:
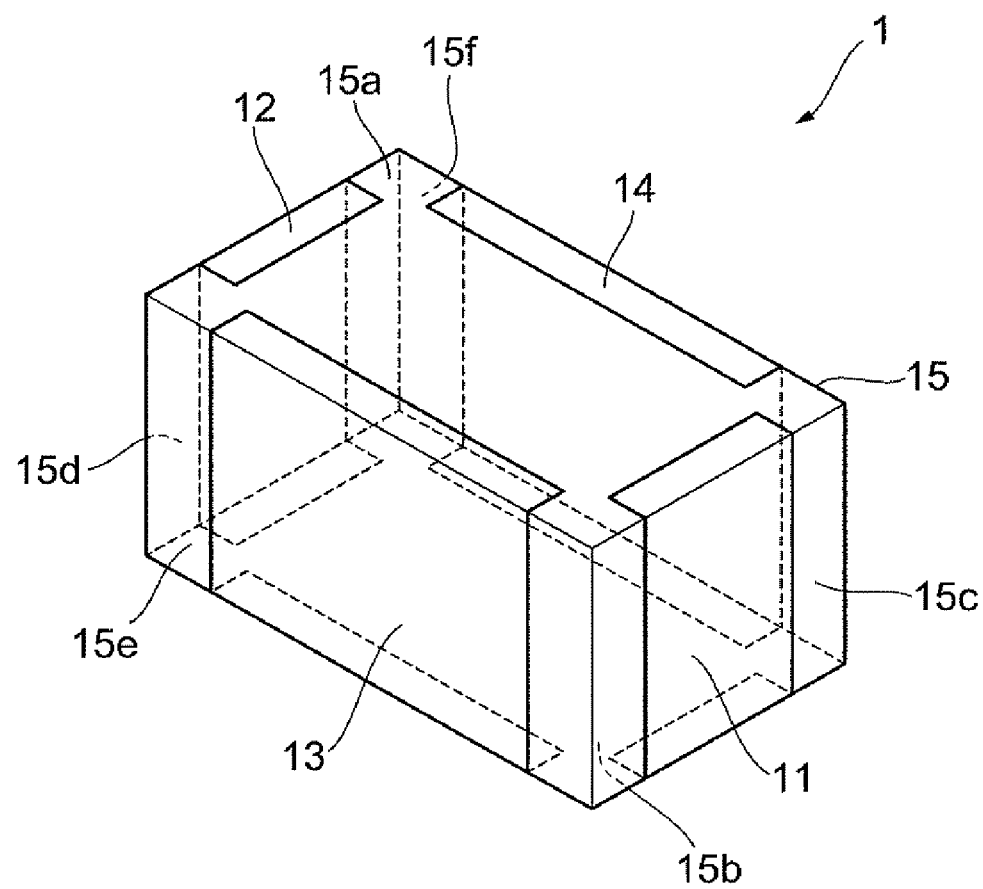
FIG. 3 is a perspective view of an NTC capacitor in accordance with the first embodiment.
Figure 4:
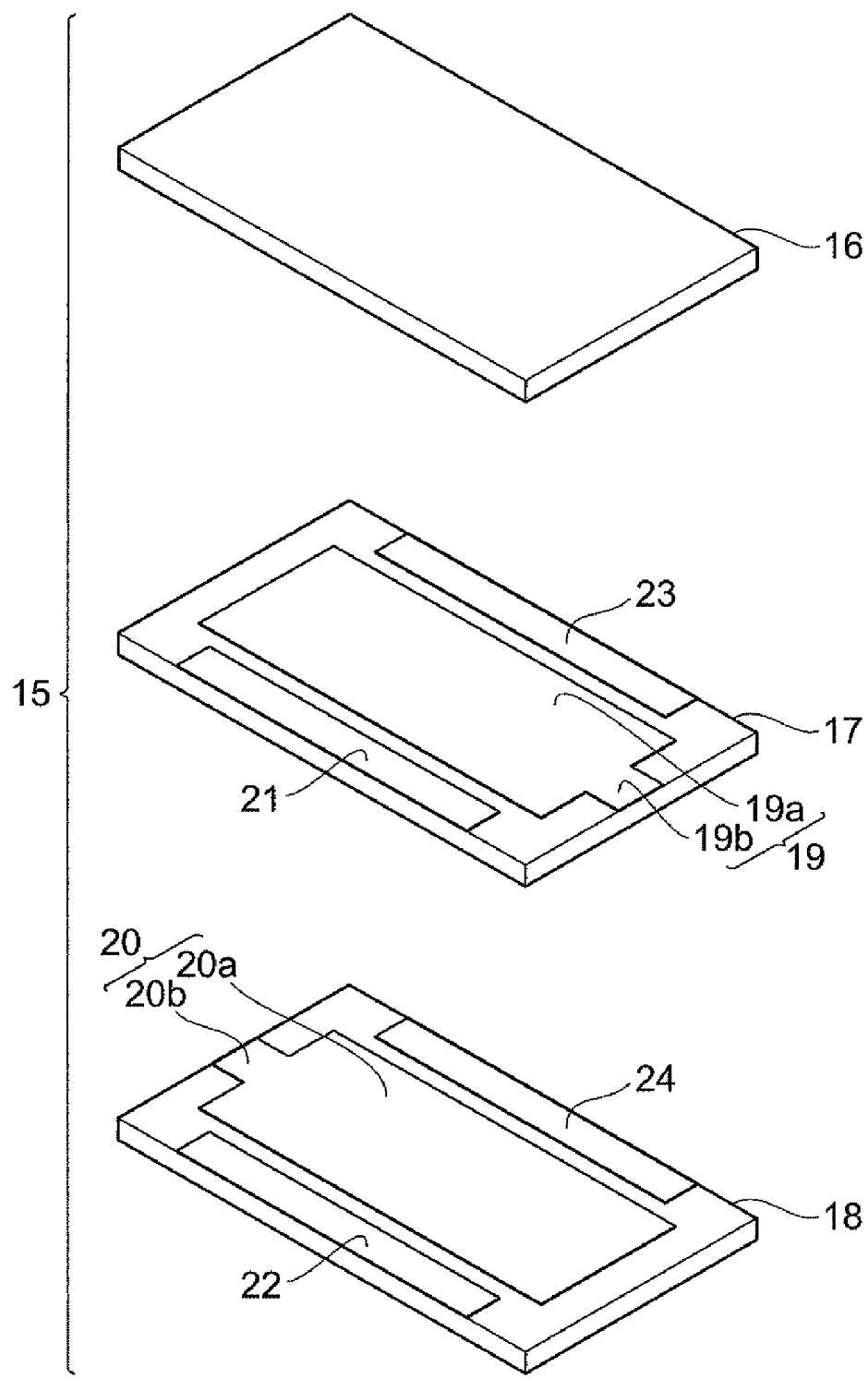
FIG. 4 is an exploded perspective view of a capacitor body included in the NTC capacitor in accordance with the first embodiment.

The NTC capacitor 1 will now be explained in detail with reference to FIGS. 3 and 4. FIG. 3 is a perspective view of the NTC capacitor 1. FIG. 4 is an exploded perspective view of a capacitor body included in the NTC capacitor 1.

As shown in FIG. 3, the NTC capacitor 1 comprises a capacitor body 15 and first to third terminal electrodes 11 to 14 arranged on outer surfaces of the capacitor body 15. The first to third terminal electrodes 11 to 14 are formed, for example, by attaching and burning a conductive paste, which contains a conductive metal powder and a glass frit, onto the outer surfaces of the capacitor body 15. A plating layer may be formed on the burned terminal electrodes when necessary. The first to third terminal electrodes 11 to 14 are formed such as to be electrically insulated from each other on the surfaces of the capacitor body 15.

As shown in FIG. 3, the capacitor body 15 is formed like a rectangular parallelepiped having first and second rectangular main faces 15a, 15b opposing each other, first and second end faces 15c, 15d extending along shorter sides of the first and second main faces 15a, 15b so as to connect the first and second main faces 15a, 15b to each other and opposing each other, and first and second side faces 15e, 15f extending along longer sides of the first and second main faces 15a, 15b so as to connect the first and second main faces 15a, 15b to each other and opposing each other as the outer surfaces.

The first terminal electrode 11 is arranged on the first end face 15c of the capacitor body 15. Specifically, the first terminal electrode 11 is arranged such as to cover a portion near the center of the first end face 15c in the opposing direction of the first and second side faces 15e, 15f. The second terminal electrode 12 is arranged on the second end face 15d of the capacitor body 15. Specifically, the second terminal electrode 12 is arranged such as to cover a portion near the center of the second end face 15d in the opposing direction of the first and second side faces 15e, 15f. The first and second terminal electrodes 11, 12 oppose each other in the opposing direction of the first and second end faces 15c, 15d.

The third terminal electrode 13 is arranged on the first side face 15e of the capacitor body 15. The third terminal electrode 14 is arranged on the second side face 15f of the capacitor body 15. The pair of third terminal electrodes 13, 14 oppose each other in the opposing direction of the first and second side faces 15e, 15f. The width of each of the third terminal electrodes 13, 14 in the opposing direction of the first and second end faces 15c, 15d is greater than any of the widths of the first and second terminal electrodes 11, 12 in the opposing direction of the first and second side faces 15e, 15f.

As shown in FIG. 4, the capacitor body 15 has a plurality of (3 in this embodiment) laminated insulator layers 16 to 18. Each of the insulator layers 16 to 18 is constituted by a sintered body of a ceramic green sheet containing a dielectric ceramic, for example. In the actual NTC capacitor 1, the insulator layers 16 to 18 are integrated to such an extent that their boundaries are indiscernible.

The capacitor body 15 changes an electric characteristic according to temperature. Specifically, the capacitor body 15 decreases its capacitance value as temperature rises.

As shown in FIG. 4, a first inner electrode 19, a second inner electrode 20, and a plurality of (4 in this embodiment) third inner electrodes 21 to 24 are arranged in the capacitor body 15. Each of the inner electrodes 19 to 24 is constituted by a sintered body of a conductive paste, for example.

The first inner electrode 19 is positioned between the insulator layers 16 and 17. The second inner electrode 20 is positioned between the insulator layers 17 and 18. The first inner electrode 19 and second inner electrode 20 are arranged so as to oppose each other while holding one insulator layer 17 that is a portion of the capacitor body 15 therebetween in the laminating direction of the insulator layers 16 to 18. Namely, the first inner electrode 19 and second inner electrode 20 are arranged alternately while holding the insulator layer 17 therebetween in the laminating direction of the insulator layers 16 to 18, i.e., the opposing direction of the first and second main faces 15a, 15b, in the capacitor body 15.

The first inner electrode 19 includes a main electrode portion 19a and a lead electrode portion 19b. The main electrode portion 19a exhibits a rectangular form whose longer side direction is that of the first and second main faces 15a, 15b of the capacitor body 15. The lead electrode portion 19b extends from the main electrode portion 19a to the first end face 15c such that an end portion is exposed at the first end face 15c. At the exposed end portion, the lead electrode portion 19b is mechanically connected to the first terminal electrode 11. The first inner electrode 19 is connected to none of the second and third terminal electrodes 12 to 14 but the first terminal electrode 11.

The second inner electrode 20 includes a main electrode portion 20a opposing the main electrode portion 19a of the first inner electrode 19 and a lead electrode portion 20b. The main electrode portion 20a exhibits a rectangular form whose longer side direction is that of the first and second main faces 15a, 15b of the capacitor body 15. The lead electrode portion 20b extends from the main electrode portion 20a to the second end face 15d such that an end portion is exposed at the second end face 15d. At the exposed end portion, the lead electrode portion 20b is mechanically connected to the second terminal electrode 12. The second inner electrode 20 is connected to none of the first and third terminal electrodes 11, 13, 14 but the second terminal electrode 12.

The third inner electrodes 21, 23 are positioned on the same layer with the first inner electrode 19 in the laminating direction of the insulator layers 16 to 18. The third inner electrode 21 is positioned on the first side face 15e side of the first inner electrode 19. The third inner electrode 23 is positioned on the second side face 15f side of the first inner electrode 19.

The third inner electrode 21 exhibits a rectangular form whose longer side direction is that of the first and second main faces 15a, 15b of the capacitor body 15. The third inner electrode 21 extends to the first side face 15e such that an end portion corresponding to a longer side of the rectangle is exposed at the first side face 15e. At the exposed end portion, the third inner electrode 21 is mechanically connected to the third terminal electrode 13.

The third inner electrode 23 exhibits a rectangular form whose longer side direction is that of the first and second main faces 15a, 15b of the capacitor body 15. The third inner electrode 23 extends to the second side face 15f such that an end portion corresponding to a longer side of the rectangle is exposed at the second side face 15f. At the exposed end portion, the third inner electrode 23 is mechanically connected to the third terminal electrode 14.

The third inner electrodes 22, 24 are positioned on the same layer with the second inner electrode 20 in the laminating direction of the insulator layers 16 to 18. The third inner electrode 22 is positioned on the first side face 15e side of the second inner electrode 20. The third inner electrode 24 is positioned on the second side face 15f side of the second inner electrode 20.

The third inner electrode 22 exhibits a rectangular form whose longer side direction is that of the first and second main faces 15a, 15b of the capacitor body 15. The third inner electrode 22 extends to the first side face 15e such that an end portion corresponding to a longer side of the rectangle is exposed at the first side face 15e. At the exposed end portion, the third inner electrode 22 is mechanically connected to the third terminal electrode 13.

The third inner electrode 24 exhibits a rectangular form whose longer side direction is that of the first and second main faces 15a, 15b of the capacitor body 15. The third inner electrode 24 extends to the second side face 15f such that an end portion corresponding to a longer side of the rectangle is exposed at the second side face 15f. At the exposed end portion, the third inner electrode 24 is mechanically connected to the third terminal electrode 14.

The third inner electrodes 21, 22 oppose each other while holding the insulator layer 17 therebetween in the laminating direction of the insulator layers 16 to 18. The third inner electrodes 23, 24 oppose each other while holding the insulator layer 17 therebetween in the laminating direction of the insulator layers 16 to 18. The third inner electrodes 21 to 24 oppose none of the first and second inner electrodes 19, 20 in the laminating direction of the insulator layers 16 to 18.

The third inner electrodes 21 to 24 are connected to none of the first and second terminal electrodes 11, 12 but the third terminal electrodes 13, 14.

Figure 5:
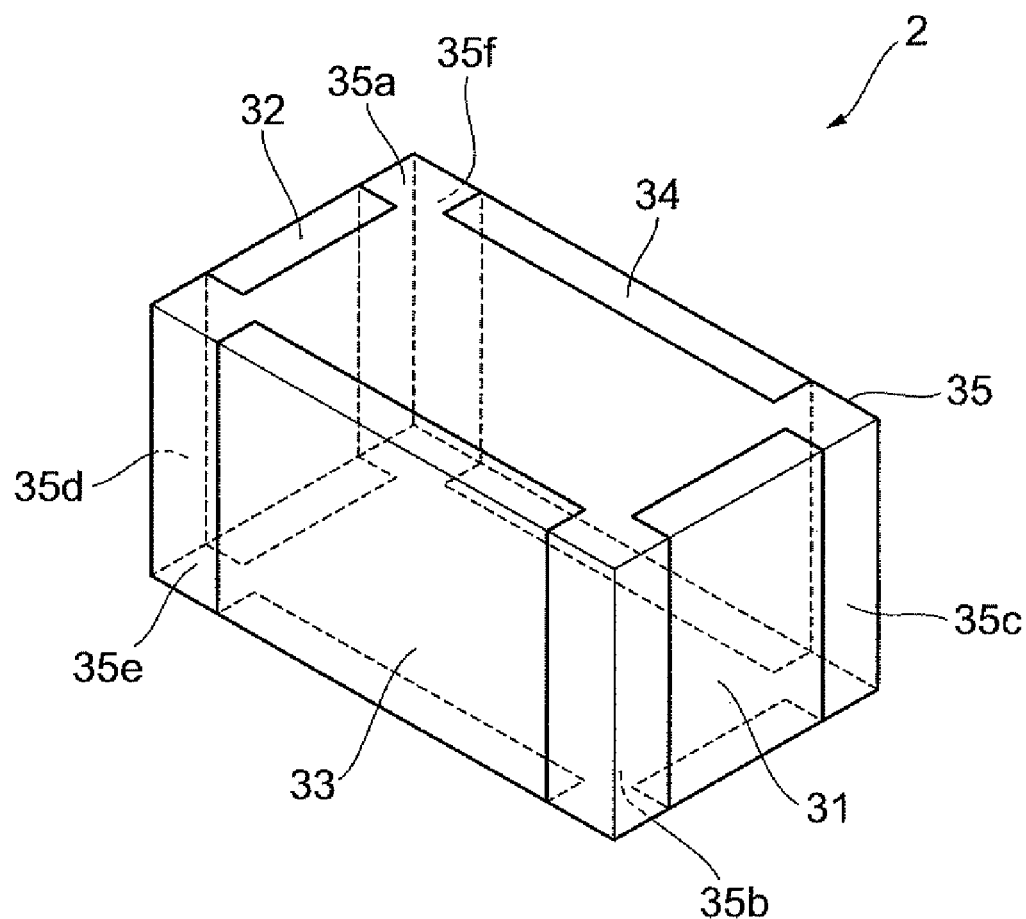
FIG. 5 is a perspective view of an NTC thermistor in accordance with the first embodiment.
Figure 6:
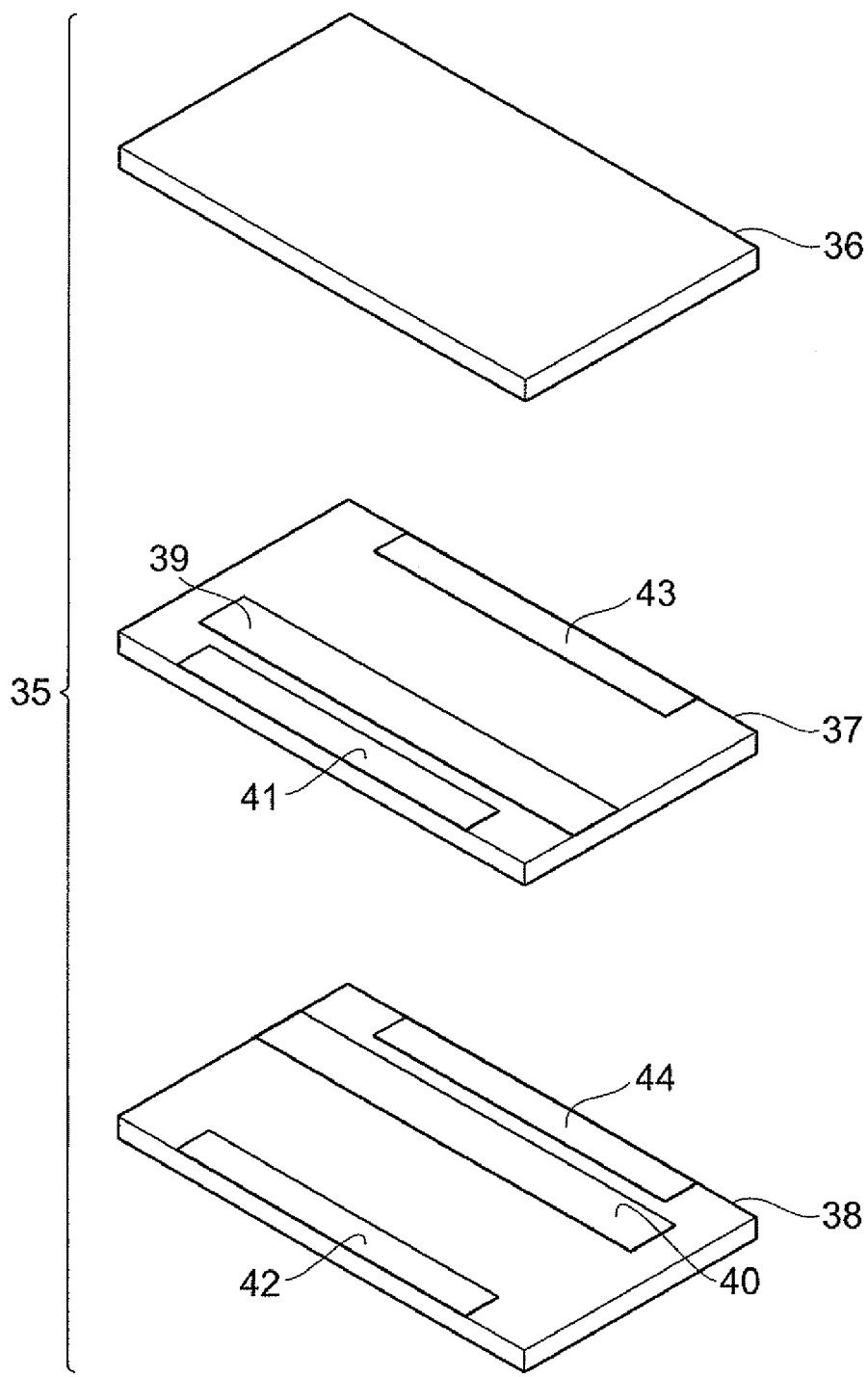
FIG. 6 is an exploded perspective view of a thermistor body included in the NTC thermistor in accordance with the first embodiment.

The NTC thermistor 2 will now be explained in detail with reference to FIGS. 5 and 6. FIG. 5 is a perspective view of the NTC thermistor 2. FIG. 6 is an exploded perspective view of a thermistor body included in the NTC thermistor 2.

As shown in FIG. 5, the NTC thermistor 2 comprises a thermistor body 35 and first to third terminal electrodes 31 to 34 arranged on outer surfaces of the thermistor body 35. The first to third terminal electrodes 31 to 34 are formed, for example, by attaching and burning a conductive paste, which contains a conductive metal powder and a glass frit, onto the outer surfaces of the thermistor body 35. A plating layer may be formed on the burned terminal electrodes when necessary. The first to third terminal electrodes 31 to 34 are formed such as to be electrically insulated from each other on the surfaces of the thermistor body 35.

As shown in FIG. 5, the thermistor body 35 is formed like a rectangular parallelepiped having first and second rectangular main faces 35a, 35b opposing each other, first and second end faces 35c, 35d extending along shorter sides of the first and second main faces 35a, 35b so as to connect the first and second main faces 35a, 35b to each other and opposing each other, and first and second side faces 35e, 35f extending along longer sides of the first and second main faces 35a, 35b so as to connect the first and second main faces 35a, 35b to each other and opposing each other.

The first terminal electrode 31 is arranged on the first end face 35c of the thermistor body 35. Specifically, the first terminal electrode 31 is arranged such as to cover a portion shifted toward the first side face 35e from the center of the first end face 35c in the opposing direction of the first and second side faces 35e, 35f. The second terminal electrode 32 is arranged on the second end face 35d of the thermistor body 35. Specifically, the second terminal electrode 32 is arranged such as to cover a portion shifted toward the second side face 35f from the center of the second end face 35d in the opposing direction of the first and second side faces 35e, 35f.

The third terminal electrode 33 is arranged on the first side face 35e of the thermistor body 35. The third terminal electrode 34 is arranged on the second side face 35f of the thermistor body 35. The pair of third terminal electrodes 33, 34 oppose each other in the opposing direction of the first and second side faces 35e, 35f. The width of each of the third terminal electrodes 33, 34 in the opposing direction of the first and second end faces 35c, 35d is greater than any of the widths of the first and second terminal electrodes 31, 32 in the opposing direction of the first and second side faces 35e, 35f.

As shown in FIG. 6, the thermistor body 35 has a plurality of (3 in this embodiment) laminated insulator layers 36 to 38. Each of the insulator layers 36 to 38 is constituted by a sintered body of a ceramic green sheet containing a dielectric ceramic, for example. In the actual NTC thermistor 2, the insulator layers 36 to 38 are integrated to such an extent that their boundaries are indiscernible.

The thermistor body 35 changes an electric characteristic according to temperature. Specifically, the thermistor body 35 decreases its resistance value as temperature rises.

As shown in FIG. 6, a first inner electrode 39, a second inner electrode 40, and a plurality of (4 in this embodiment) third inner electrodes 41 to 44 are arranged in the thermistor body 35. Each of the inner electrodes 39 to 44 is constituted by a sintered body of a conductive paste, for example.

The first inner electrode 39 is positioned between the insulator layers 36 and 37. The second inner electrode 40 is positioned between the insulator layers 37 and 38. The first inner electrode 39 and second inner electrode 40 are arranged with no opposing area therebetween in the laminating direction of the insulator layers 36 to 38. Namely, the first inner electrode 39 is arranged on the first side face 35e side of the second inner electrode 40 as seen in the laminating direction of the insulator layers 36 to 38.

The first inner electrode 39 exhibits a rectangular form whose longer side direction is that of the first and second main faces 35a, 35b of the thermistor body 35. The first inner electrode 39 extends to the first end face 35c such that an end portion is exposed at the first end face 35c. At the exposed end portion, the first inner electrode 39 is mechanically connected to the first terminal electrode 31. The first inner electrode 39 is connected to none of the second and third terminal electrodes 32 to 34 but the first terminal electrode 31.

The second inner electrode 40 exhibits a rectangular form whose longer side direction is that of the first and second main faces 35a, 35b of the thermistor body 35. The second inner electrode 40 extends to the second end face 35d such that an end portion is exposed at the second end face 35d. At the exposed end portion, the second inner electrode 40 is mechanically connected to the second terminal electrode 32. The second inner electrode 40 is connected to none of the first and third terminal electrodes 31, 33, 34 but the second terminal electrode 32.

The third inner electrodes 41, 43 are positioned on the same layer with the first inner electrode 39 in the laminating direction of the insulator layers 36 to 38. The third inner electrode 41 is positioned on the first side face 35e side of the first inner electrode 39. The third inner electrode 43 is positioned on the second side face 35f side of the first inner electrode 39.

The third inner electrode 41 exhibits a rectangular form whose longer side direction is that of the first and second main faces 35a, 35b of the thermistor body 35. The third inner electrode 41 extends to the first side face 35e such that an end portion corresponding to a longer side of the rectangle is exposed at the first side face 35e. At the exposed end portion, the third inner electrode 41 is mechanically connected to the third terminal electrode 33.

The third inner electrode 43 exhibits a rectangular form whose longer side direction is that of the first and second main faces 35a, 35b of the thermistor body 35. The third inner electrode 43 extends to the second side face 35f such that an end portion corresponding to a longer side of the rectangle is exposed at the second side face 35f. At the exposed end portion, the third inner electrode 43 is mechanically connected to the third terminal electrode 34.

The third inner electrodes 42, 44 are positioned on the same layer with the second inner electrode 40 in the laminating direction of the insulator layers 36 to 38. The third inner electrode 42 is positioned on the first side face 35e side of the second inner electrode 40. The third inner electrode 44 is positioned on the second side face 35f side of the second inner electrode 40.

The third inner electrode 42 exhibits a rectangular form whose longer side direction is that of the first and second main faces 35a, 35b of the thermistor body 35. The third inner electrode 42 extends to the first side face 35e such that an end portion corresponding to a longer side of the rectangle is exposed at the first side face 35e. At the exposed end portion, the third inner electrode 42 is mechanically connected to the third terminal electrode 33.

The third inner electrode 44 exhibits a rectangular form whose longer side direction is that of the first and second main faces 35a, 35b of the thermistor body 35. The third inner electrode 44 extends to the second side face 35f such that an end portion corresponding to a longer side of the rectangle is exposed at the second side face 35f. At the exposed end portion, the third inner electrode 44 is mechanically connected to the third terminal electrode 34.

The third inner electrodes 41, 42 oppose each other while holding the insulator layer 37 therebetween in the laminating direction of the insulator layers 36 to 38. The third inner electrodes 43, 44 oppose each other while holding the insulator layer 37 therebetween in the laminating direction of the insulator layers 36 to 38. The third inner electrodes 41 to 44 oppose none of the first and second inner electrodes 39, 40 in the laminating direction of the insulator layers 36 to 38.

The third inner electrodes 41 to 44 are connected to none of the first and second terminal electrodes 31, 32 but the third terminal electrodes 33, 34.

In the NTC capacitor 1, the first to third inner electrodes 19 to 24 are connected to only their corresponding terminal electrodes in the first to third terminal electrodes 11 to 14. Namely, the first to third inner electrodes 19 to 24 are not short-circuited within the NTC capacitor 1. Therefore, the terminal electrodes of the choke coil 3, which is a heating device, can be connected to the third terminal electrodes 13, 14. Changes in temperature of the choke coil 3 can be transmitted to the NTC capacitor 1 through not only the air but also terminal electrodes which are conductors. As a result, the NTC capacitor 1 can detect the changes in temperature of the choke coil 3 rapidly and accurately.

The third inner electrodes 21 to 24 in the NTC capacitor 1 oppose none of the first and second inner electrodes 19, 20 in the laminating direction of the insulator layers 16 to 18. This restrains the third inner electrodes 21 to 24 from affecting the first and second inner electrodes 19, 20 even when the third terminal electrodes 13, 14 are connected to the terminal electrodes of the choke coil 3, for example.

In the NTC capacitor 1, the third terminal electrodes 13, 14 are arranged on the first or second side face 15e, 15f extending longitudinally of the capacitor body 15 having a rectangular parallelepiped form. Therefore, when the third terminal electrodes 13, 14 are connected to a heating device, temperature can be detected more rapidly and accurately through wider terminal electrodes.

In the NTC capacitor 1, the third inner electrodes 21 to 24 are arranged such that their longer sides are exposed at the first or second side face 15e, 15f. The longer side of each of the third inner electrodes 21 to 24 corresponds to the width of each of the third terminal electrodes 13, 14 in the opposing direction of the first and second end faces 15c, 15d. Therefore, the temperature changes transmitted to the third terminal electrodes 13, 14 are sent to the NTC capacitor 1 rapidly and accurately through the third inner electrodes 21 to 24.

In the NTC thermistor 2, the first to third inner electrodes 39 to 44 are connected to only their corresponding terminal electrodes in the first to third terminal electrodes 31 to 34. Namely, the first to third inner electrodes 39 to 44 are not short-circuited within the NTC thermistor 2. Therefore, the terminal electrodes of the choke coil 3, which is a heating device, can be connected to the third terminal electrodes 33, 34. Changes in temperature of the choke coil 3 can be transmitted to the NTC thermistor 2 through not only the air but also terminal electrodes which are conductors. As a result, the NTC thermistor 2 can detect the changes in temperature of the choke coil 3 rapidly and accurately.

The third inner electrodes 41 to 44 in the NTC thermistor 2 oppose none of the first and second inner electrodes 39, 40 in the laminating direction of the insulator layers 36 to 38. This restrains the third inner electrodes 41 to 44 from affecting the first and second inner electrodes 39, 40 even when the third terminal electrodes 33, 34 are connected to the terminal electrodes of the choke coil 3, for example.

In the NTC thermistor 2, the third terminal electrodes 33, 34 are arranged on the first or second side face 35e, 35f extending longitudinally of the thermistor body 35 having a rectangular parallelepiped form. Therefore, when the third terminal electrodes 33, 34 are connected to a heating device, temperature can be detected more rapidly and accurately through wider terminal electrodes.

In the NTC thermistor 2, the third inner electrodes 41 to 44 are arranged such that their longer sides are exposed at the first or second side face 35e, 35f. The longer side of each of the third inner electrodes 41 to 44 corresponds to the width of each of the third terminal electrodes 33, 34 in the opposing direction of the first and second end faces 35c, 35d. Therefore, the temperature changes transmitted to the third terminal electrodes 33, 34 are sent to the NTC thermistor 2 rapidly and accurately through the third inner electrodes 41 to 44.

In the mounting structure for mounting the NTC capacitor 1 and NTC thermistor 2 to the substrate S, as shown in FIGS. 1 and 2, the terminal electrodes 3A, 3B of the choke coil 3 are connected to the third terminal electrode 34 of the NTC thermistor 2 through a conductor, while the terminal electrodes 3C, 3D of the choke coil 3 are connected to the third terminal electrode 14 of the NTC capacitor 1 through a conductor. Therefore, the NTC capacitor 1 and NTC thermistor 2 can detect changes in temperature of the choke coil 3 rapidly and accurately.

Second Embodiment

Figure 7:
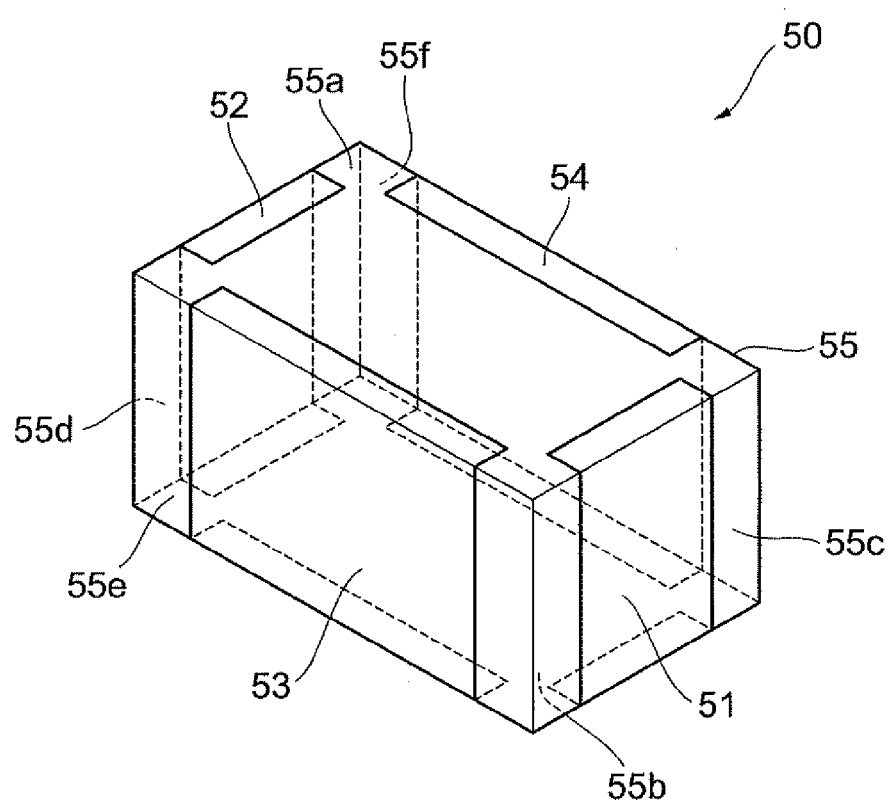
FIG. 7 is a perspective view of an NTC capacitor in accordance with a second embodiment.
Figure 8:
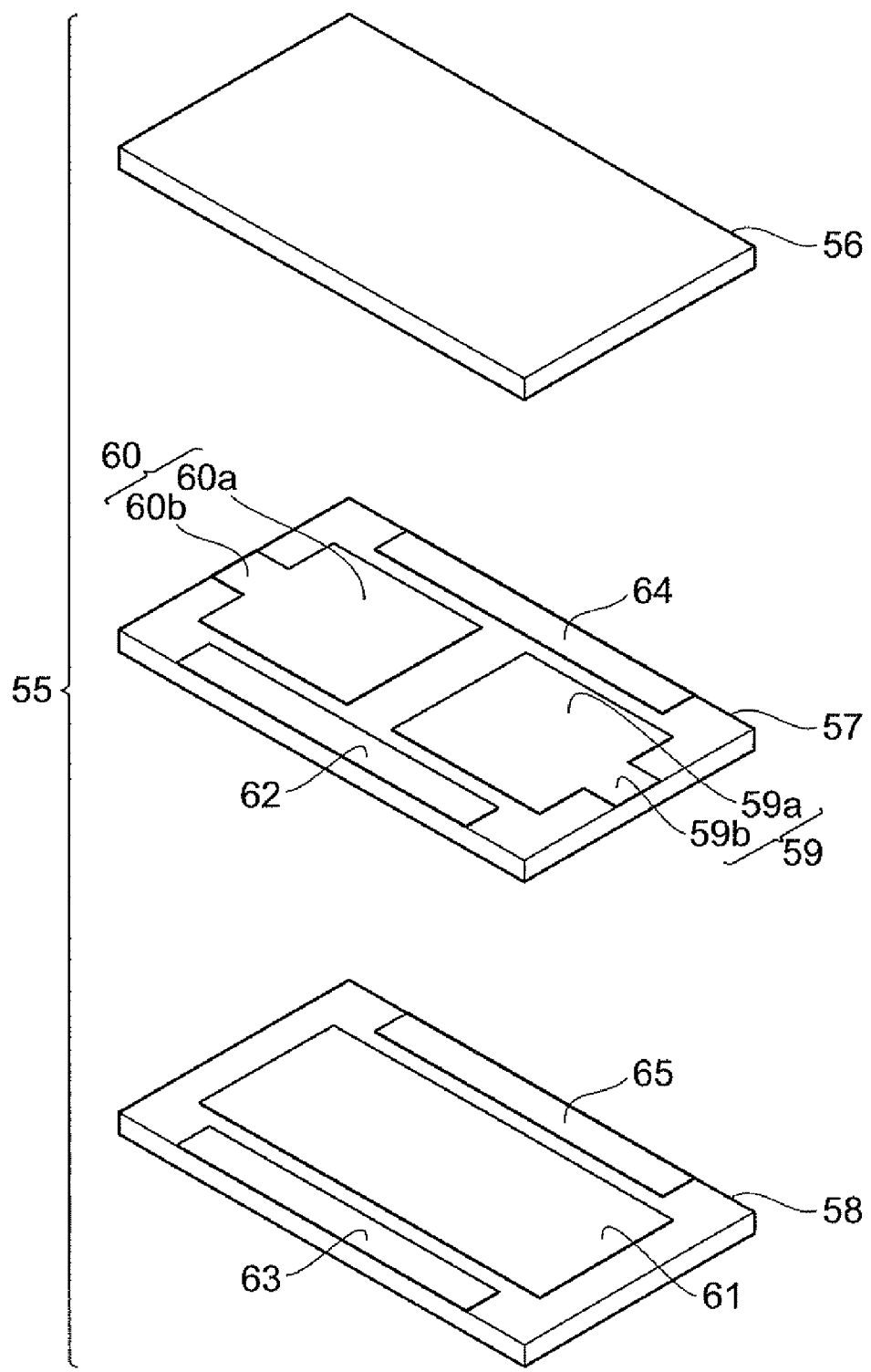
FIG. 8 is an exploded perspective view of a capacitor body included in the NTC capacitor in accordance with the second embodiment.

The NTC capacitor 50 in accordance with the second embodiment will now be explained in detail with reference to FIGS. 7 and 8. The NTC capacitor 50 in accordance with the second embodiment differs from the NTC capacitor 1 in accordance with the first embodiment in that it has an intermediate electrode not directly connected to the terminal electrodes. FIG. 7 is a perspective view of the NTC capacitor 50. FIG. 8 is an exploded perspective view of a capacitor body included in the NTC capacitor 50.

As shown in FIG. 7, the NTC capacitor 50 comprises a capacitor body 55 and first to third terminal electrodes 51 to 54 arranged on outer surfaces of the capacitor body 55. The first to third terminal electrodes 51 to 54 are formed such as to be electrically insulated from each other on the surfaces of the capacitor body 55.

As shown in FIG. 7, the capacitor body 55 is formed like a rectangular parallelepiped having first and second rectangular main faces 55a, 55b opposing each other, first and second end faces 55c, 55d extending along shorter sides of the first and second main faces 55a, 55b so as to connect the first and second main faces 55a, 55b to each other and opposing each other, and first and second side faces 55e, 55f extending along longer sides of the first and second main faces 55a, 55b so as to connect the first and second main faces 55a, 55b to each other and opposing each other.

The first terminal electrode 51 is arranged on the first end face 55c of the capacitor body 55. Specifically, the first terminal electrode 51 is arranged such as to cover a portion near the center of the first end face 55c in the opposing direction of the first and second side faces 55e, 55f. The second terminal electrode 52 is arranged on the second end face 55d of the capacitor body 55. Specifically, the second terminal electrode 52 is arranged such as to cover a portion near the center of the second end face 55d in the opposing direction of the first and second side faces 55e, 55f. The first and second terminal electrodes 51, 52 oppose each other in the opposing direction of the first and second end faces 55c, 55d.

The third terminal electrode 53 is arranged on the first side face 55e of the capacitor body 55. The third terminal electrode 54 is arranged on the second side face 55f of the capacitor body 55. The pair of third terminal electrodes 53, 54 oppose each other in the opposing direction of the first and second side faces 55e, 55f. The width of each of the third terminal electrodes 53, 54 in the opposing direction of the first and second end faces 55c, 55d is greater than any of the widths of the first and second terminal electrodes 51, 52 in the opposing direction of the first and second side faces 55e, 55f.

As shown in FIG. 8, the capacitor body 55 has a plurality of (3 in this embodiment) laminated insulator layers 56 to 58. As shown in FIG. 8, a first inner electrode 59, a second inner electrode 60, an intermediate inner electrode 61, and a plurality of (4 in this embodiment) third inner electrodes 62 to 65 are arranged in the capacitor body 55.

The capacitor body 55 changes an electric characteristic according to temperature. Specifically, the capacitor body 55 decreases its capacitance value as temperature rises.

The first and second inner electrodes 59, 60 are positioned between the insulator layers 56, 57. The first and second inner electrodes 59, 60 are arranged in this order along the opposing direction of the first and second end faces 55a, 55d. Namely, the first and second inner electrodes 59, 60 are located closer to the first and second end faces 55c, 55d, respectively, than is the center position in the opposing direction of the first and second end faces 55c, 55d.

The first inner electrode 59 includes a main electrode portion 59a and a lead electrode portion 59b. The main electrode portion 59a exhibits a rectangular form whose longer and shorter side directions are those of the first and second main faces 55a, 55b of the capacitor body 55. The lead electrode portion 59b extends from the main electrode portion 59a such as to expose an end portion at the first end face 55c. At the exposed end portion, the lead electrode portion 59b is mechanically connected to the first terminal electrode 51. The first inner electrode 59 is connected to none of the second and third terminal electrodes 52 to 54 but the first terminal electrode 51.

The second inner electrode 60 includes a main electrode portion 60a and a lead electrode portion 60b. The main electrode portion 60a exhibits a rectangular form whose longer and shorter side directions are those of the first and second main faces 55a, 55b of the capacitor body 55. The lead electrode portion 60b extends from the main electrode portion 60a such as to expose an end portion at the second end face 55d. At the exposed end portion, the lead electrode portion 60b is mechanically connected to the second terminal electrode 52. The second inner electrode 60 is connected to none of the first and third terminal electrodes 51, 53, 54 but the second terminal electrode 52.

The intermediate inner electrode 61 is positioned between the insulator layers 57, 58. The intermediate inner electrode 61 exhibits a rectangular form whose longer side direction is that of the first and second main faces 55a, 55b of the capacitor body 55. The intermediate inner electrode 61 is arranged at a position separated by predetermined distances from the first and second end faces 55c, 55d and first and second side faces 55e, 55f. Therefore, the intermediate inner electrode 61 has no portion exposed at the outer surfaces of the capacitor body 55 and is connected to none of the first to third terminal electrodes 51 to 54.

The intermediate inner electrode 61 has both of areas opposing the first and second inner electrodes 59, 60, respectively, through the insulator layer 57.

The third inner electrodes 62, 64 are positioned on the same layer with the first and second inner electrodes 59, 60 in the laminating direction of the insulator layers 56 to 58. The third inner electrode 62 is positioned on the first side face 55e side of the first and second inner electrodes 59, 60. The third inner electrode 64 is positioned on the second side face 55f side of the first and second inner electrodes 59, 60.

Each of the third inner electrodes 62, 64 exhibits a rectangular form whose longer side direction is that of the first and second main faces 55a, 55b of the capacitor body 55. The third inner electrode 62 extends such that an end portion corresponding to a longer side of the rectangle reaches the first side face 55e, and is mechanically connected to the third terminal electrode 53. The third inner electrode 64 extends such that an end portion corresponding to a longer side of the rectangle reaches the second side face 55f, and is mechanically connected to the third terminal electrode 54.

The third inner electrodes 63, 65 are positioned on the same layer with the intermediate inner electrode 61 in the laminating direction of the insulator layers 56 to 58. The third inner electrode 63 is positioned on the first side face 55e side of the intermediate inner electrode 61. The third inner electrode 65 is positioned on the second side face 55f side of the intermediate inner electrode 61.

Each of the third inner electrodes 63, 65 exhibits a rectangular form whose longer side direction is that of the first and second main faces 55a, 55b of the capacitor body 55. The third inner electrode 63 extends such that an end portion corresponding to a longer side of the rectangle reaches the first side face 55e, and is mechanically connected to the third terminal electrode 53. The third inner electrode 65 extends such that an end portion corresponding to a longer side of the rectangle reaches the second side face 55f, and is mechanically connected to the third terminal electrode 54.

The third inner electrodes 62, 63 oppose each other while holding the insulator layer 57 therebetween in the laminating direction of the insulator layers 56 to 58. The third inner electrodes 64, 65 oppose each other while holding the insulator layer 57 therebetween in the laminating direction of the insulator layers 56 to 58. The third inner electrodes 62 to 65 oppose none of the first and second inner electrodes 59, 60 and intermediate inner electrode 61 in the laminating direction of the insulator layers 56 to 58.

The third inner electrodes 62 to 65 are connected to none of the first and second terminal electrodes 51, 52 but the third terminal electrodes 53, 54.

In the NTC capacitor 50, the first to third inner electrodes 59, 60, 62 to 65 are connected to only their corresponding terminal electrodes in the first to third terminal electrodes 51 to 54. The intermediate inner electrode 61 is connected to none of the terminal electrodes. Namely, the first to third inner electrodes 59, 60, 62 to 65 and intermediate inner electrode 61 are not short-circuited within the NTC capacitor 50. Therefore, when terminal electrodes of a heating device, for example, are connected to the third terminal electrodes 53, 54, the NTC capacitor 50 can detect changes in temperature of the heating device rapidly and accurately.

The third inner electrodes 62 to 65 in the NTC capacitor 50 oppose none of the first and second inner electrodes 59, 60 and intermediate inner electrode 61 in the laminating direction of the insulator layers 56 to 58. This restrains the third inner electrodes 62 to 65 from affecting the first and second inner electrodes 59, 60 even when the third terminal electrodes 53, 54 are connected to the terminal electrodes of the heating device, for example.

In the NTC capacitor 50, the third terminal electrodes 53, 54 are arranged on the first or second side face 55e, 55f extending longitudinally of the capacitor body 55 having a rectangular parallelepiped form. Therefore, when the third terminal electrodes 53, 54 are connected to a heating device, temperature can be detected more rapidly and accurately through wider terminal electrodes.

In the NTC capacitor 50, the third inner electrodes 62 to 65 are arranged such that their longer sides are exposed at the first or second side face 55e, 55f. Therefore, the temperature changes transmitted to the third terminal electrodes 53, 54 are sent to the NTC capacitor 50 rapidly and accurately through the third inner electrodes 62 to 65.

Third Embodiment

Figure 9:
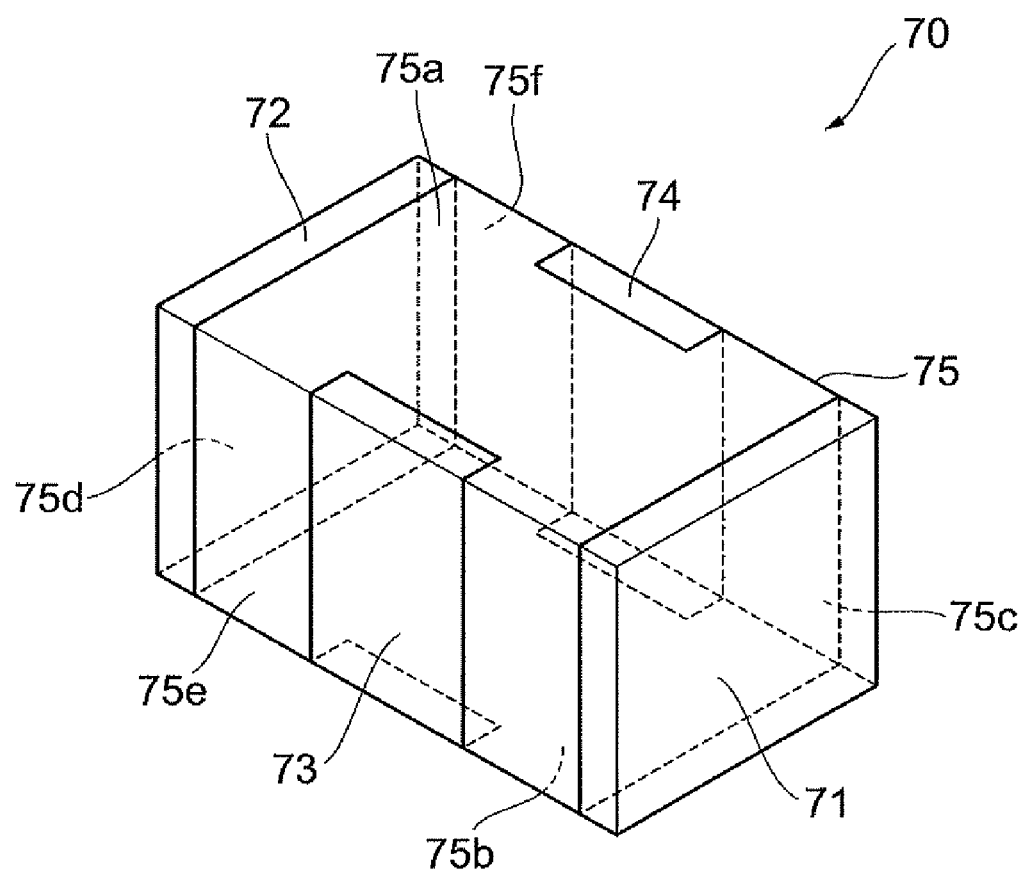
FIG. 9 is a perspective view of an NTC capacitor in accordance with a third embodiment.
Figure 10:
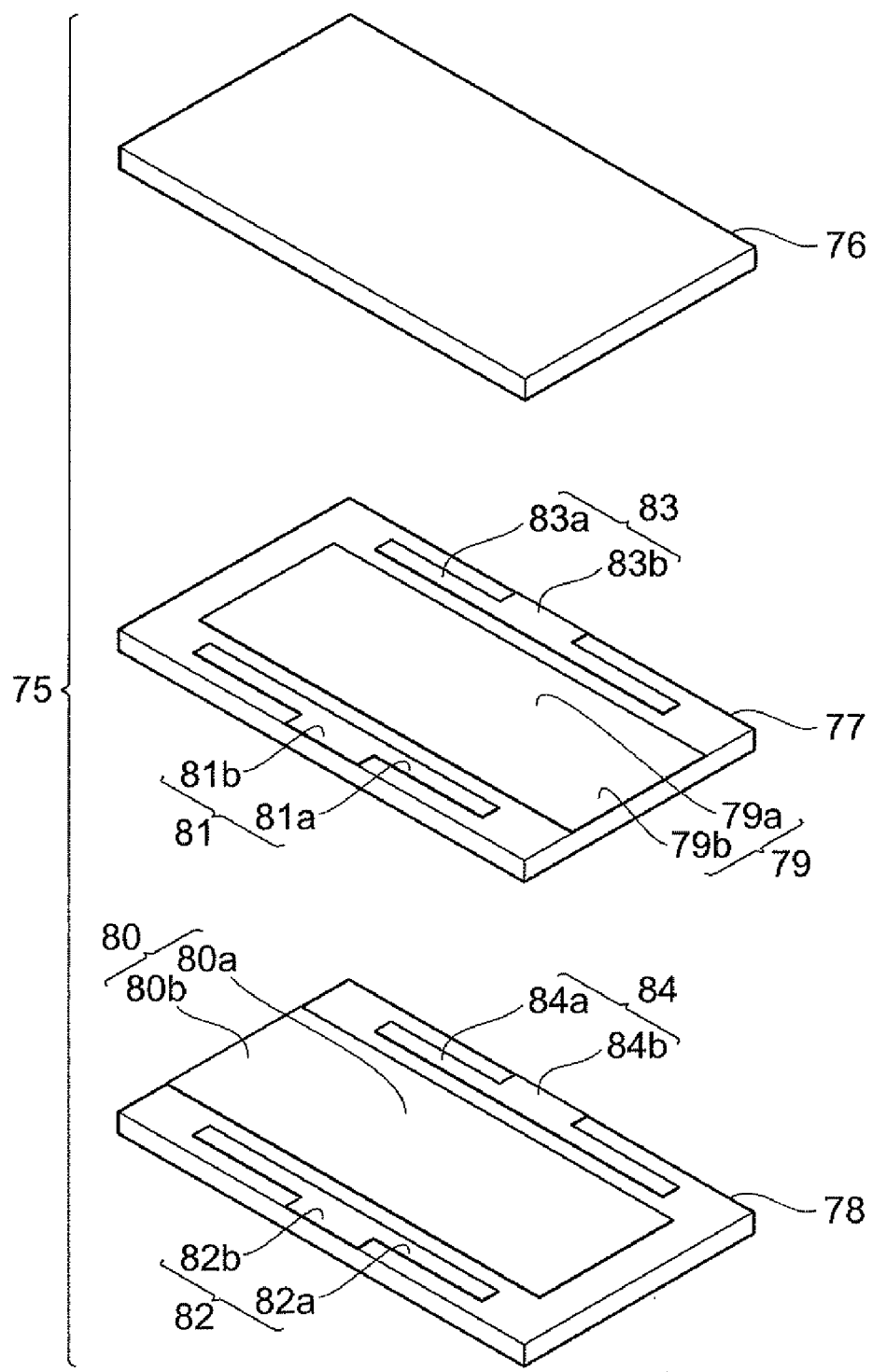
FIG. 10 is an exploded perspective view of a capacitor body included in the NTC capacitor in accordance with the third embodiment.

The NTC capacitor 70 in accordance with the third embodiment will now be explained in detail with reference to FIGS. 9 and 10. The NTC capacitor 70 in accordance with the third embodiment differs from the NTC capacitor 1 in accordance with the first embodiment in forms of terminal electrodes and inner electrodes. FIG. 9 is a perspective view of the NTC capacitor 70. FIG. 10 is an exploded perspective view of a capacitor body included in the NTC capacitor 70.

As shown in FIG. 9, the NTC capacitor 70 comprises a capacitor body 75 and first to third terminal electrodes 71 to 74 arranged on outer surfaces of the capacitor body 75. The first to third terminal electrodes 71 to 74 are formed such as to be electrically insulated from each other on the surfaces of the capacitor body 75.

As shown in FIG. 9, the capacitor body 75 is formed like a rectangular parallelepiped having first and second rectangular main faces 75a, 75b opposing each other, first and second end faces 75c, 75d extending along shorter sides of the first and second main faces 75a, 75b so as to connect the first and second main faces 75a, 75b to each other and opposing each other, and first and second side faces 75e, 75f extending along longer sides of the first and second main faces 75a, 75b so as to connect the first and second main faces 75a, 75b to each other and opposing each other.

The first terminal electrode 71 is arranged on the first end face 75c of the capacitor body 75. Specifically, the first terminal electrode 71 is arranged such as to cover the whole area of the first terminal electrode 75c and extend over a portion of the first and second main faces 75a, 75b and first and second side faces 75e, 75f adjacent to the first end face 75c. The second terminal electrode 72 is arranged on the second end face 75d of the capacitor body 75. Specifically, the second terminal electrode 72 is arranged such as to cover the whole area of the second terminal electrode 75d and extend over a portion of the first and second main faces 75a, 75b and first and second side faces 75e, 75f adjacent to the second end face 75d. The first and second terminal electrodes 71, 72 oppose each other in the opposing direction of the first and second end faces 75c, 75d.

The third terminal electrode 73 is arranged on the first side face 75e of the capacitor body 75. Specifically, the third terminal electrode 73 is arranged such as to cover a portion of the first side face 75e near the center in the opposing direction of the first and second end faces 75c, 75d. The third terminal electrode 74 is arranged on the second side face 75f of the capacitor body 75. Specifically, the third terminal electrode 74 is arranged such as to cover a portion of the second side face 75f near the center in the opposing direction of the first and second end faces 75c, 75d. The pair of third terminal electrodes 73, 74 oppose each other in the opposing direction of the first and second side faces 75e, 75f. The width of each of the third terminal electrodes 73, 74 in the opposing direction of the first and second end faces 75c, 75d is smaller than any of the widths of the first and second terminal electrodes 71, 72 in the opposing direction of the first and second side faces 75e, 75f.

As shown in FIG. 10, the capacitor body 75 has a plurality of (3 in this embodiment) laminated insulator layers 76 to 78. As shown in FIG. 10, a first inner electrode 79, a second inner electrode 80, and a plurality of (4 in this embodiment) third inner electrodes 81 to 84 are arranged in the capacitor body 75.

The capacitor body 75 changes an electric characteristic according to temperature. Specifically, the capacitor body 75 decreases its capacitance value as temperature rises.

The first inner electrode 79 is positioned between the insulator layers 76, 77. The second inner electrode 80 is positioned between the insulator layers 77, 78. The first and second inner electrodes 79, 80 are arranged such as to oppose each other while holding one insulator layer 77 that is a portion of the capacitor body 75 therebetween in the laminating direction of the insulator layers 76 to 78.

The first inner electrode 79 includes a main electrode portion 79a and a lead electrode portion 79b. The main electrode portion 79a exhibits a rectangular form whose longer side direction is that of the first and second main faces 75a, 75b of the capacitor body 75.

In the opposing direction of the first and second side faces 75e, 75f, the width of the lead electrode portion 79b is the same as that of the main electrode portion 79a. Namely, the first inner electrode 79 exhibits a rectangular form whose longer side direction is that of the first and second main faces 75a, 75b of the capacitor body 75. The lead electrode portion 79b extends from the main electrode portion 79a to the first end face 75c such that an end portion is exposed at the first end face 75c. At the exposed end portion, the lead electrode portion 79b is mechanically connected to the first terminal electrode 71. The first inner electrode 79 is connected to none of the second and third terminal electrodes 72 to 74 but the first terminal electrode 71.

The second inner electrode 80 includes a main electrode portion 80a and a lead electrode portion 80b. The main electrode portion 80a exhibits a rectangular form whose longer side direction is that of the first and second main faces 75a, 75b of the capacitor body 75.

In the opposing direction of the first and second side faces 75e, 75f, the width of the lead electrode portion 80b is the same as that of the main electrode portion 80a. Namely, the second inner electrode 80 exhibits a rectangular form whose longer side direction is that of the first and second main faces 75a, 75b of the capacitor body 75. The lead electrode portion 80b extends from the main electrode portion 80a to the second end face 75d such that an end portion is exposed at the second end face 75d. At the exposed end portion, the lead electrode portion 80b is mechanically connected to the second terminal electrode 72. The second inner electrode 80 is connected to none of the first and third terminal electrodes 71, 73, 74 but the second terminal electrode 72.

The third inner electrodes 81, 83 are positioned on the same layer with the first inner electrode 79 in the laminating direction of the insulator layers 76 to 78. The third inner electrode 81 is positioned on the first side face 75e side of the first inner electrode 79. The third inner electrode 83 is positioned on the second side face 75f side of the first inner electrode 79.

The third inner electrode 81 includes a main electrode portion 81a and a lead electrode portion 81b. The main electrode portion 81a exhibits a rectangular form whose longer side direction is that of the first and second main faces 75a, 75b of the capacitor body 75. The lead electrode portion 81b extends from the main electrode portion 81a to the first side face 75e such that an end portion is exposed at the first side face 75e. At the exposed end portion, the lead electrode portion 81b is mechanically connected to the third terminal electrode 73. The third inner electrode 81 is connected to none of the first and second terminal electrodes 71, 72 but the third terminal electrode 73.

The third inner electrode 83 includes a main electrode portion 83a and a lead electrode portion 83b. The main electrode portion 83a exhibits a rectangular form whose longer side direction is that of the first and second main faces 75a, 75b of the capacitor body 75. The lead electrode portion 83b extends from the main electrode portion 83a to the second side face 75f such that an end portion is exposed at the second side face 75f. At the exposed end portion, the lead electrode portion 83b is mechanically connected to the third terminal electrode 74. The third inner electrode 83 is connected to none of the first and second terminal electrodes 71, 72 but the third terminal electrode 74.

The third inner electrodes 82, 84 are positioned on the same layer with the second inner electrode 80 in the laminating direction of the insulator layers 76 to 78. The third inner electrode 82 is positioned on the first side face 75e side of the second inner electrode 80. The third inner electrode 84 is positioned on the second side face 75f side of the second inner electrode 80.

The third inner electrode 82 includes a main electrode portion 82a and a lead electrode portion 82b. The main electrode portion 82a exhibits a rectangular form whose longer side direction is that of the first and second main faces 75a, 75b of the capacitor body 75. The lead electrode portion 82b extends from the main electrode portion 82a to the first side face 75e such that an end portion is exposed at the first side face 75e. At the exposed end portion, the lead electrode portion 82b is mechanically connected to the third terminal electrode 73. The third inner electrode 82 is connected to none of the first and second terminal electrodes 71, 72 but the third terminal electrode 73.

The third inner electrode 84 includes a main electrode portion 84a and a lead electrode portion 84b. The main electrode portion 84a exhibits a rectangular form whose longer side direction is that of the first and second main faces 75a, 75b of the capacitor body 75. The lead electrode portion 84b extends from the main electrode portion 84a to the second side face 75f such that an end portion is exposed at the second side face 75f. At the exposed end portion, the lead electrode portion 84b is mechanically connected to the third terminal electrode 74. The third inner electrode 84 is connected to none of the first and second terminal electrodes 71, 72 but the third terminal electrode 74.

The third inner electrodes 81, 82 oppose each other while holding the insulator layer 77 therebetween in the laminating direction of the insulator layers 76 to 78. The third inner electrodes 83, 84 oppose each other while holding the insulator layer 77 therebetween in the laminating direction of the insulator layers 76 to 78. The third inner electrodes 81 to 84 oppose none of the first and second inner electrodes 79, 80 in the laminating direction of the insulator layers 76 to 78.

In the NTC capacitor 70, the first to third inner electrodes 79 to 84 are connected to only their corresponding terminal electrodes in the first to third terminal electrodes 71 to 74. Namely, the first to third inner electrodes 79 to 87 are not short-circuited within the NTC capacitor 70. Therefore, when terminal electrodes of a heating device, for example, are connected to the third terminal electrodes 73, 74, the NTC capacitor 70 can detect changes in temperature of the heating device rapidly and accurately.

The third inner electrodes 81 to 84 in the NTC capacitor 70 oppose none of the first and second inner electrodes 79, 80 in the laminating direction of the insulator layers 76 to 78. This restrains the third inner electrodes 81 to 84 from affecting the first and second inner electrodes 79, 80 even when the third terminal electrodes 73, 74 are connected to the terminal electrodes of the heating device, for example.

Fourth Embodiment

Figure 11:
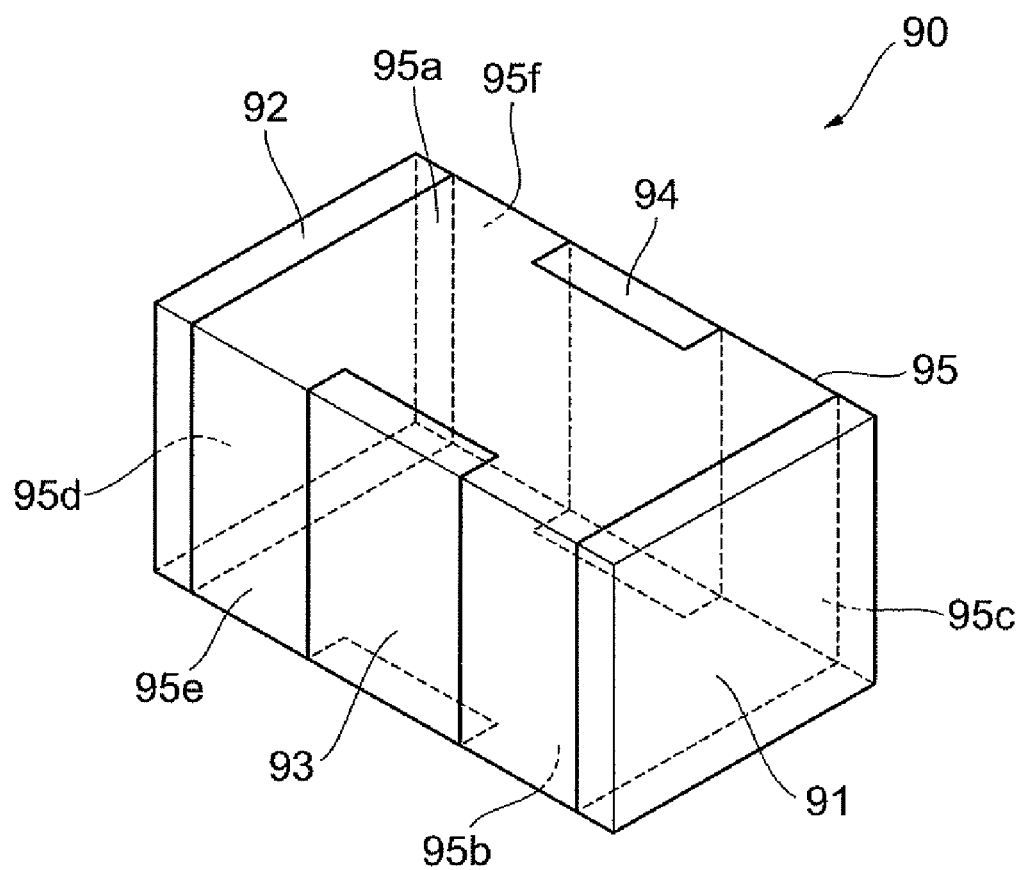
FIG. 11 is a perspective view of an NTC capacitor in accordance with a fourth embodiment.
Figure 12:
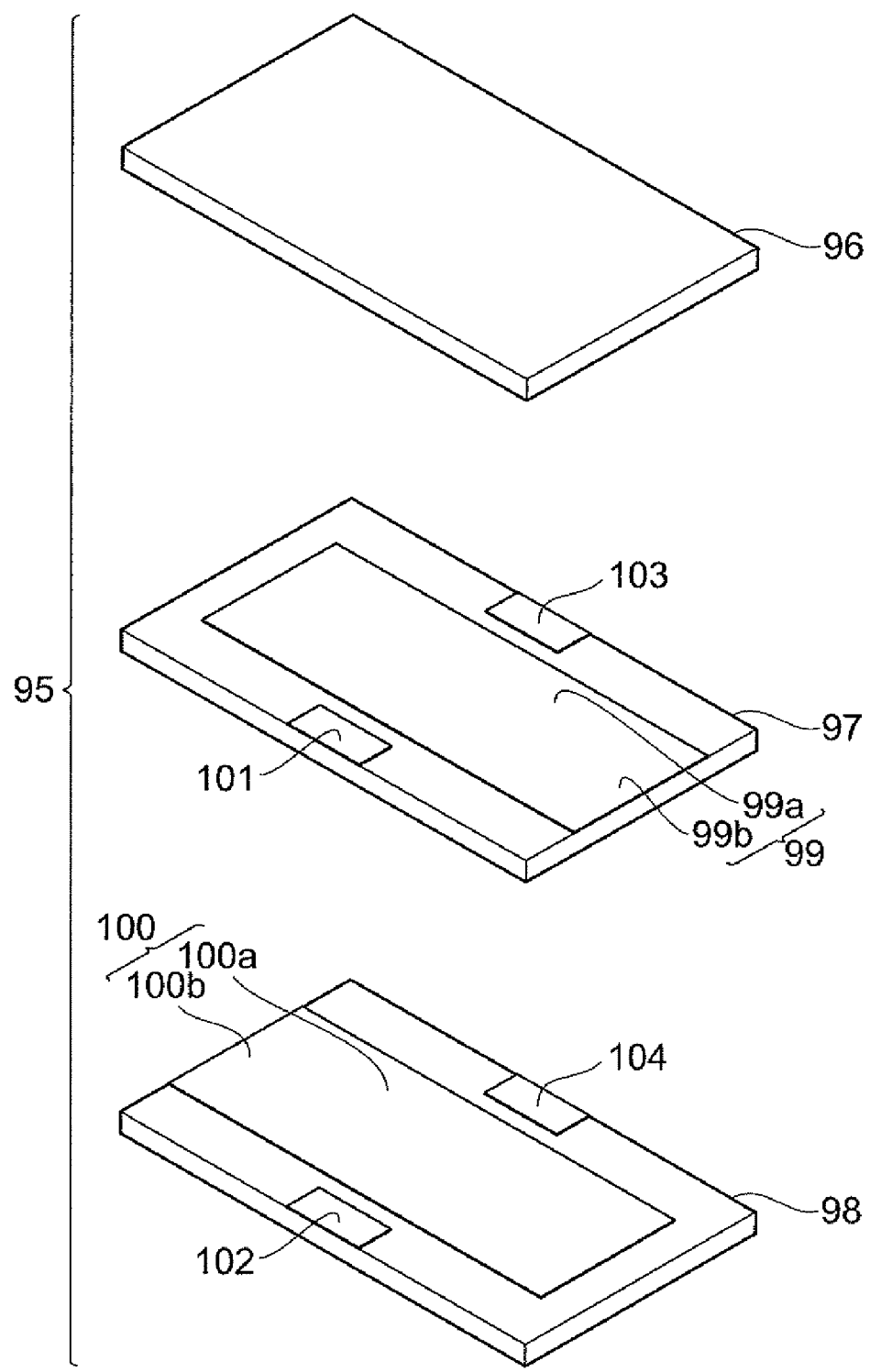
FIG. 12 is an exploded perspective view of a capacitor body included in the NTC capacitor in accordance with the fourth embodiment.

The NTC capacitor 90 in accordance with the fourth embodiment will now be explained in detail with reference to FIGS. 11 and 12. The NTC capacitor 90 in accordance with the fourth embodiment differs from the NTC capacitor 1 in accordance with the first embodiment in forms of terminal electrodes and inner electrodes. FIG. 11 is a perspective view of the NTC capacitor 90. FIG. 12 is an exploded perspective view of a capacitor body included in the NTC capacitor 90.

As shown in FIG. 11, the NTC capacitor 90 comprises a capacitor body 95 and first to third terminal electrodes 91 to 94 arranged on outer surfaces of the capacitor body 95. The first to third terminal electrodes 91 to 94 are formed such as to be electrically insulated from each other on the surfaces of the capacitor body 95.

As shown in FIG. 11, the capacitor body 95 is formed like a rectangular parallelepiped having first and second rectangular main faces 95a, 95b opposing each other, first and second end faces 95c, 95d extending along shorter sides of the first and second main faces 95a, 95b so as to connect the first and second main faces 95a, 95b to each other and opposing each other, and first and second side faces 95e, 95f extending along longer sides of the first and second main faces 95a, 95b so as to connect the first and second main faces 95a, 95b to each other and opposing each other.

The first terminal electrode 91 is arranged such as to cover the whole area of the first terminal electrode 95c and extend over a portion of the first and second main faces 95a, 95b and first and second side faces 95e, 95f adjacent to the first end face 95c. The second terminal electrode 92 is arranged such as to cover the whole area of the second terminal electrode 95d and extend over a portion of the first and second main faces 95a, 95b and first and second side faces 95e, 95f adjacent to the second end face 95d.

The third terminal electrode 93 is arranged such as to cover a portion of the first side face 95e near the center in the opposing direction of the first and second end faces 95c, 95d. The third terminal electrode 94 is arranged such as to cover a portion of the second side face 95f near the center in the opposing direction of the first and second end faces 95c, 95d. The pair of third terminal electrodes 93, 94 oppose each other in the opposing direction of the first and second side faces 95e, 95f. The width of each of the third terminal electrodes 93, 94 in the opposing direction of the first and second end faces 95c, 95d is smaller than any of the widths of the first and second terminal electrodes 91, 92 in the opposing direction of the first and second side faces 95e, 95f.

As shown in FIG. 12, the capacitor body 95 has a plurality of (3 in this embodiment) laminated insulator layers 96 to 98. As shown in FIG. 12, a first inner electrode 99, a second inner electrode 100, and a plurality of (4 in this embodiment) third inner electrodes 101 to 104 are arranged in the capacitor body 95.

The capacitor body 95 changes an electric characteristic according to temperature. Specifically, the capacitor body 95 decreases its capacitance value as temperature rises.

The first inner electrode 99 is positioned between the insulator layers 96, 97. The second inner electrode 100 is positioned between the insulator layers 97, 98. The first and second inner electrodes 99, 100 are arranged such as to oppose each other while holding one insulator layer 97 that is a portion of the capacitor body 95 therebetween in the laminating direction of the insulator layers 96 to 98.

The first inner electrode 99 includes a main electrode portion 99a and a lead electrode portion 99b. The main electrode portion 99a exhibits a rectangular form whose longer side direction is that of the first and second main faces 95a, 95b of the capacitor body 95.

In the opposing direction of the first and second side faces 95e, 95f, the width of the lead electrode portion 99b is the same as that of the main electrode portion 99a. The lead electrode portion 99b extends from the main electrode portion 99a to the first end face 95c such that an end portion reaches the first end face 95c, and is mechanically connected to the first terminal electrode 91. The first inner electrode 99 is connected to none of the second and third terminal electrodes 92 to 94 but the first terminal electrode 91.

The second inner electrode 100 includes a main electrode portion 100a and a lead electrode portion 100b. The main electrode portion 100a exhibits a rectangular form whose longer side direction is that of the first and second main faces 95a, 95b of the capacitor body 95.

In the opposing direction of the first and second side faces 95e, 95f the width of the lead electrode portion 100b is the same as that of the main electrode portion 100a. The lead electrode portion 100b extends from the main electrode portion 100a to the second end face 95d such that an end portion reaches the second end face 95d, and is mechanically connected to the second terminal electrode 92. The second inner electrode 100 is connected to none of the first and third terminal electrodes 91, 93, 94 but the second terminal electrode 92.

The third inner electrodes 101, 103 are positioned on the same layer with the first inner electrode 99 in the laminating direction of the insulator layers 96 to 98. The third inner electrode 101 is positioned on the first side face 95e side of the first inner electrode 99. The third inner electrode 103 is positioned on the second side face 95f side of the first inner electrode 99.

Each of the third inner electrodes 101, 103 exhibits a rectangular form whose longer side direction is that of the first and second main faces 95a, 95b in the capacitor body 95. The third inner electrode 101 extends such that an end portion corresponding to a longer side of the rectangle reaches the first side face 95e, and is mechanically connected to the third terminal electrode 93. The third inner electrode 103 extends such that an end portion corresponding to a longer side of the rectangle reaches the first side face 95f, and is mechanically connected to the third terminal electrode 94.

The third inner electrodes 102, 104 are positioned on the same layer with the second inner electrode 100 in the laminating direction of the insulator layers 96 to 98. The third inner electrode 102 is positioned on the first side face 95e side of the second inner electrode 100. The third inner electrode 104 is positioned on the second side face 95f side of the second inner electrode 100.

Each of the third inner electrodes 102, 104 exhibits a rectangular form whose longer side direction is that of the first and second main faces 95a, 95b in the capacitor body 95. The third inner electrode 102 extends such that an end portion corresponding to a longer side of the rectangle reaches the first side face 95e, and is mechanically connected to the third terminal electrode 93. The third inner electrode 104 extends such that an end portion corresponding to a longer side of the rectangle reaches the first side face 95f, and is mechanically connected to the third terminal electrode 94.

The third inner electrodes 101, 102 oppose each other while holding the insulator layer 97 therebetween in the laminating direction of the insulator layers 96 to 98. The third inner electrodes 103, 104 oppose each other while holding the insulator layer 97 therebetween in the laminating direction of the insulator layers 96 to 98. The third inner electrodes 101 to 104 oppose none of the first and second inner electrodes 99, 100 in the laminating direction of the insulator layers 96 to 98.

The third inner electrodes 101 to 104 are connected to none of the first and second terminal electrodes 91, 92 but the third terminal electrodes 93, 94.

In the NTC capacitor 90, the first to third inner electrodes 99 to 104 are connected to only their corresponding terminal electrodes in the first to third terminal electrodes 91 to 94. Namely, the first to third inner electrodes 99 to 104 are not short-circuited within the NTC capacitor 90. Therefore, when terminal electrodes of a heating device, for example, are connected to the third terminal electrodes 93, 94, the NTC capacitor 90 can detect changes in temperature of the heating device rapidly and accurately.

The third inner electrodes 101 to 104 in the NTC capacitor 90 oppose none of the first and second inner electrodes 99, 100 in the laminating direction of the insulator layers 96 to 98. This restrains the third inner electrodes 101 to 104 from affecting the first and second inner electrodes 99, 100 even when the third terminal electrodes 93, 94 are connected to the terminal electrodes of the heating device, for example.

Though preferred embodiments are explained in detail in the foregoing, the present invention is not limited to the above-mentioned embodiments. For example, in the circuit shown in FIGS. 1 and 2, one of the NTC capacitor 1 and NTC thermistor 2 may be connected to the choke coil 3 instead of both.

Examples of the multilayer ceramic device include PTC (positive temperature coefficient) capacitors and PTC thermistors. Therefore, the capacitor matrices 15, 55, 75, 95, for example, may be matrices which increase their capacitance values as temperature rises. The thermistor body 35 may be a body which increases its resistance value as temperature rises. Here, the PTC capacitor refers to a multilayer ceramic device having a positive temperature characteristic, i.e., a characteristic in which the capacitance value increases as temperature rises. The PTC thermistor refers to a multilayer ceramic device having a positive temperature characteristic, i.e., a characteristic in which the resistance value increases as temperature rises.

The number of laminations of dielectric layers 16 to 18, 36 to 38, 56 to 58, 76 to 78, 96 to 98, the numbers of laminations of first to third inner electrodes 19 to 24, 39 to 42, 59, 60, 62 to 65, 79 to 84, 99 to 104, and the number of lamination of intermediate inner electrode 61 are not limited to those described in the above-mentioned embodiments.

The forms of first to third inner electrodes 19 to 24, 39 to 42, 59, 60, 62 to 65, 79 to 84, 99 to 104 and intermediate inner electrode 61 are not limited to those described in the above-mentioned embodiments.

The arrangements of first to third terminal electrodes 11, 31, 51, 71, 91, 12, 32, 52, 72, 92, 13, 14, 33, 34, 53, 54, 73, 74, 93, 94 are not limited to those described in the above-mentioned embodiments as long as they are electrically insulated from each other on their body surface. Therefore, the third terminal electrode may be arranged on the first or second end face, for example.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:
1. A multilayer ceramic device comprising:
a body, adapted to change an electric characteristic according to temperature, having a plurality of insulator layers laminated therein;
first, second, and third inner electrodes arranged within the body; and
first, second, and third terminal electrodes arranged on an outer surface of the body, wherein
the first to third terminal electrodes are electrically insulated from each other on the outer surface of the body,
the first inner electrode is connected to only the first terminal electrode,
the second inner electrode is connected to only the second terminal electrode,
the third inner electrode is connected to only the third terminal electrode, the first inner electrode overlaps with the second inner electrode in a laminating direction of the insulator layers, and the third inner electrode does not overlap the first inner electrode and does not overlap the second inner electrode in the laminating direction of the insulator layers, and is coplanar with one of the first inner electrode or the second inner electrode.

2. The multilayer ceramic device according to claim 1, wherein the body is formed like a rectangular parallelepiped having first and second rectangular main faces opposing each other, first and second side faces extending along longer sides of the first and second main faces to connect the first and second main faces to each other and opposing each other, and first and second end faces extending along shorter sides of the first and second main faces so as to connect the first and second main faces to each other and opposing each other, the third terminal electrode is arranged on the first or second side face, and the third inner electrode extends so as to reach the first or second side face arranged with the third terminal electrode and is connected to the third terminal electrode.

3. The multilayer ceramic device according to claim 2, wherein a width of the third terminal electrode in an opposing direction of the first and second end faces is greater than any of widths of the first and second terminal electrodes in an opposing direction of the first and second side faces.

4. The multilayer ceramic device according to claim 2, wherein the plurality of insulator layers of the body includes a first insulator layer, the third inner electrode includes at least two electrodes, one of the third inner electrodes is arranged on the first insulator layer on which the first or second inner electrode is arranged in the body, and the other of the third inner electrodes is arranged on a second insulator layer which is different from the first insulator layer in the laminating direction.

5. The multilayer ceramic device according to claim 4, wherein the one and the other of the third inner electrodes are arranged on the first or second insulator layer respectively opposite each other in the laminating direction.

6. The multilayer ceramic device according to claim 1, wherein the first and second inner electrodes are arranged on an insulator layer of the plurality of insulator layers respectively, and the third inner electrode is arranged on the insulator layer on which the first or second inner electrode is arranged in the body.

7. The multilayer ceramic device according to claim 1, wherein the third terminal electrode is a terminal electrode for connecting the multilayer ceramic device to a heating device.

8. The multilayer ceramic device according to claim 1, wherein the first to third inner electrodes are not short-circuited with each other within the body.

9. The multilayer ceramic device according to claim 1, wherein the third terminal electrode is a heat input electrode that is connected directly to a heat generating electronic device, and that inputs to the multilayer ceramic device the heat generated by the electronic device.

10. The multilayer ceramic device according to claim 9, wherein the multilayer ceramic device is one of either a capacitor or a resistor, and the first terminal electrode is the first terminal of the multilayer ceramic device for connecting the multilayer ceramic device to a circuit, and the second terminal electrode is the second terminal of the multilayer ceramic device for connecting the multilayer ceramic device to the circuit.

11. A mounting structure for mounting a multilayer ceramic device to a substrate mounted with an electronic device adapted to generate heat, the multilayer ceramic device comprising:

a body, adapted to change an electric characteristic according to temperature, having a plurality of insulator layers laminated therein;

first, second, and third inner electrodes arranged within the body; and first, second, and third terminal electrodes arranged on an outer surface of the body, wherein the first to third terminal electrodes are electrically insulated from each other on the outer surface of the body, the first inner electrode is connected to only the first terminal electrode, the second inner electrode is connected to only the second terminal electrode, the third inner electrode is connected to only the third terminal electrode, the first inner electrode overlaps with the second inner electrode in a laminating direction of the insulator layers, the third inner electrode does not overlap the first inner electrode and does not overlap the second inner electrode in the laminating direction of the insulator layers, and is coplanar with one of the first inner electrode or the second inner electrode, and the third terminal electrode and a terminal electrode of the electronic device are electrically connected to each other on the substrate.

12. The mounting structure according to claim 11, wherein the first and second inner electrodes are arranged on an insulator layer of the plurality of insulator layers respectively; and wherein the third inner electrode is arranged on the insulator layer on which the first or second inner electrode is arranged in the body.

13. The mounting structure according to claim 11, wherein the third terminal electrode is a terminal electrode for connecting the multilayer ceramic device to the electronic device.

14. The mounting structure according to claim 11, wherein the first to third inner electrodes are not short-circuited with each other within the body.

15. The mounting structure according to claim 11, wherein the third terminal electrode is a heat input electrode that is connected directly to the electronic device, and that inputs to the multilayer ceramic device the heat generated by the electronic device.

16. The mounting structure according to claim 11, wherein the multilayer ceramic device is one of either a capacitor or a resistor, and the first terminal electrode is the first terminal of the multilayer ceramic device for connecting the multilayer ceramic device to a circuit, and the second terminal electrode is the second terminal of the multilayer ceramic device for connecting the multilayer ceramic device to the circuit.

17. A multilayer ceramic device comprising:
a body, adapted to change an electric characteristic according to temperature, having a plurality of insulator layer's laminated therein;
a first terminal electrode arranged on an outer surface of the body;
a second terminal electrode arranged on the outer surface of the body;
a third terminal electrode arranged on the outer surface of the body;
a first inner electrode arranged within the body and connected only to the first terminal electrode;
a second inner electrode arranged within the body and connected only to the second terminal electrode;
a third inner electrode arranged within the body and connected only to the third terminal electrode; and
an intermediate inner electrode arranged within the body that is electrically insulated from each of the first, second and third terminal electrodes, wherein
the first, second and third terminal electrodes are electrically insulated from each other on the outer surface of the body,
both the first inner electrode and the second inner electrode overlap the intermediate inner electrode in a laminating direction of the insulator layers, and
the third inner electrode does not overlap the first inner electrode, does not overlap the second inner electrode, and does not overlap the intermediate inner electrode in the laminating direction of the insulator layers, and is coplanar with the first inner electrode or the intermediate inner electrode.

18. A mounting structure for mounting a multilayer ceramic device to a substrate mounted with an electronic device adapted to generate heat, the multilayer ceramic device comprising:
a body, adapted to change an electric characteristic according to temperature, having a plurality of insulator layers laminated therein;
a first terminal electrode arranged on an outer surface of the body;
a second terminal electrode arranged on the outer surface of the body;
a third terminal electrode arranged on the outer surface of the body;
a first inner electrode arranged within the body and connected only to the first terminal electrode;
a second inner electrode arranged within the body and connected only to the second terminal electrode;
a third inner electrode arranged within the body and connected only to the third terminal electrode; and
an intermediate inner electrode arranged within the body that is electrically insulated from each of the first, second and third terminal electrodes, wherein
the first, second and third terminal electrodes are electrically insulated from each other on the outer surface of the body,
both the first inner electrode and the second inner electrode overlap the intermediate inner electrode in a laminating direction of the insulator layers,
the third inner electrode does not overlap the first inner electrode, does not overlap the second inner electrode, and does not overlap the intermediate inner electrode in the laminating direction of the insulator layers, and is coplanar with the first inner electrode or the intermediate inner electrode, and
the third terminal electrode and a terminal electrode of the electronic device are electrically connected to each other on the substrate.

* * * * *